US012281630B2

(12) United States Patent
Lale

(10) Patent No.: US 12,281,630 B2
(45) Date of Patent: Apr. 22, 2025

(54) LIQUID FLUID INJECTION PUMPS

(71) Applicant: DELPHI TECHNOLOGIES IP LIMITED, St. Michael (BB)

(72) Inventor: Xavier Lale, Vendôme (FR)

(73) Assignee: PHINIA DELPHI LUXEMBOURG SARL, Belvaux (LU)

( * ) Notice: Subject to any disclaimer, the term of this patent is extended or adjusted under 35 U.S.C. 154(b) by 0 days.

(21) Appl. No.: 18/688,454

(22) PCT Filed: Aug. 29, 2022

(86) PCT No.: PCT/EP2022/073896
§ 371 (c)(1),
(2) Date: Mar. 1, 2024

(87) PCT Pub. No.: WO2023/031087
PCT Pub. Date: Mar. 9, 2023

(65) Prior Publication Data

US 2024/0344494 A1 Oct. 17, 2024

(30) Foreign Application Priority Data

Sep. 2, 2021 (GB) ...................................... 2112493

(51) Int. Cl.
*F02M 59/46* (2006.01)
*F02M 59/36* (2006.01)

(52) U.S. Cl.
CPC ........ *F02M 59/466* (2013.01); *F02M 59/368* (2013.01); *F02M 2200/27* (2013.01)

(58) Field of Classification Search
CPC . F02M 59/466; F02M 59/368; F02M 2200/27
See application file for complete search history.

(56) References Cited

U.S. PATENT DOCUMENTS

2014/0377109 A1* 12/2014 Hayatani ................. F04B 17/04
417/505
2022/0339391 A1* 10/2022 Gillerman .............. A61B 5/097

FOREIGN PATENT DOCUMENTS

DE 102017217363 A1 4/2019
DE 102018204004 A1 9/2019
(Continued)

OTHER PUBLICATIONS

International Search Report for PCT/EP2022/073896 dated Nov. 17, 2022, 3 pages.
(Continued)

*Primary Examiner* — Joseph J Dallo
(74) *Attorney, Agent, or Firm* — Warner Norcross + Judd LLP

(57) ABSTRACT

An injection pump having a pump body provided with an inlet conduit supplying an inlet chamber, and a compression chamber downstream from the inlet chamber under which a piston reciprocates to distribute liquid fluid from the compression chamber to an outlet pipe in communication with a common rail circuitry. The injection pump has a valve provided with a resilient cup, located between the inlet chamber and the compression chamber and actuated by an electromagnetic actuator through a pushing rod wherein operation of the valve allows the piston to suck liquid fluid from the inlet chamber into the compression chamber and feed the common rail circuitry or to push back liquid fluid in said inlet chamber and said inlet conduit, in which the pump comprises a filter provided around the pushing rod and located between the valve and the electromagnetic actuator in the inlet chamber.

7 Claims, 3 Drawing Sheets

(56) References Cited

FOREIGN PATENT DOCUMENTS

| | | | | | |
|---|---|---|---|---|---|
| WO | WO-2006007086 | A1 * | 1/2006 | ......... | B60K 17/3467 |
| WO | WO-2008075931 | A1 * | 6/2008 | ............. | C10B 47/32 |
| WO | WO-2012076234 | A1 * | 6/2012 | ............. | F02M 59/34 |
| WO | WO-2016043642 | A1 * | 3/2016 | ........... | F02M 59/367 |
| WO | WO-2019174815 | A1 * | 9/2019 | ............. | B01D 29/35 |
| WO | WO-2022034036 | A1 * | 2/2022 | ........ | A61M 15/0065 |

OTHER PUBLICATIONS

Machine assisted English translation of DE102017217363A1 obtained from https://worldwide.espacenet.com/patent on Feb. 27, 2024, 14 pages.

Machine assisted English translation of DE102018204004A1 obtained from https://worldwide.espacenet.com/patent on Feb. 27, 2024, 10 pages.

* cited by examiner

LIQUID FLUID INJECTION PUMPS

CROSS-REFERENCE TO RELATED APPLICATIONS

This application is the U.S. National Stage of International Application No. PCT/EP2022/073896 filed on 29 Aug. 2022, which claims priority to and all advantages of United Kingdom Application No. 2112493.8 filed on 2 Sep. 2021, the contents of which are incorporated herein by reference.

TECHNICAL FIELD OF THE INVENTION

The present disclosure concerns liquid fluid injection pumps and more precisely to injection pumps to distribute gasoline in common rail gasoline engines.

BACKGROUND OF THE INVENTION

Injection pumps to distribute gasoline to injectors through a common rail circuitry are known. Such pumps are provided with an inlet damper with a gasoline input, an inlet conduit from the inlet damper to an inlet chamber with a valve actuated by an electromagnetic actuator, a compression chamber in which a piston reciprocates under action of a camshaft of an engine to suck gasoline from the inlet damper, wherein the valve either closes a return path from the compression chamber to the inlet chamber and inlet conduit so that gasoline sucked from the inlet chamber is forced in a common rail circuitry in communication with the compression chamber through a non-return outlet valve in an outlet pipe or, open such return path so that gasoline may return from the compression chamber to the inlet damper.

In such a pump circuit, despite upstream filters which provide impurities to pollute the circuit, particles may travel between the inlet damper and the injection common rail circuitry and may disturb the operation of the electromagnetic actuator or cause failure of such actuator.

SUMMARY OF THE INVENTION

In view of the above element, the present disclosure proposes an injection pump having a pump body provided with an inlet conduit supplying an inlet chamber, a compression chamber downstream from the inlet chamber under which a piston reciprocates to distribute a liquid fluid such as gasoline from the compression chamber to an outlet pipe in communication with a common rail circuitry, said injection pump having a valve located between the inlet chamber and the compression chamber, provided with a resilient cup and actuated by an electromagnetic actuator through a pushing rod wherein operation of the valve by the electromagnetic actuator allows the piston to suck liquid fluid from the inlet chamber into the compression chamber and feed the common rail circuitry or to push back liquid fluid in said inlet chamber and said inlet conduit, in which the pump comprises a fixed filter provided around the pushing rod and located between the valve and the electromagnetic actuator in the inlet chamber, said filter being configured to prevent particles travelling in the inlet chamber to reach the electromagnetic actuator.

The fixed filter is easy to manufacture and mount in the pump and provides a simple way to protect the electromagnetic actuator from particles such as debris in the liquid fluid.

The filter may comprise a mesh disk, or mesh disk elements, located between a rim and a tubular sheath in which the pushing rod is received, said tubular sheath having a proximal end receiving said mesh disk or mesh disk elements and having a distal end away from said mesh disk or mesh disk elements.

The filter is positioned around the pushing rod with sufficient play to allow movements of the pushing rod.

The filter may comprise radial rods between the rim and the tubular sheath to reinforce the filter.

The filter may be trapped between an annular shoulder of a tubular sleeve of the inlet chamber and a fixed valve armature in the inlet chamber.

This maintains the filter in position without allowing particles to pass around the filter without the need of additional locking or retaining parts for the filter.

The inlet chamber may be tubular and have a common axis with an axis of the pushing rod.

An edge of said rim may sit against said annular shoulder while the distal end of said tubular sheath rests against an annular central region of said armature. The filter is safely trapped between said shoulder of the inlet chamber and the armature.

The resilient cup preferably has open liquid fluid passageways and is retained against said valve armature with rings.

When the pushing rod is extended (E), said resilient cup may open holes in said valve armature to let liquid fluid enter said compression chamber from said compression chamber through said passageways while, when said pushing rod is retracted (R) through the action of said actuator, liquid fluid may not return from said compression chamber to said inlet chamber.

The inlet conduit may be in communication with an inlet damper.

BRIEF DESCRIPTION OF THE DRAWINGS

These and other aspects of the disclosure will become apparent from the following description in accordance with the referenced drawings in which.

DETAILED DESCRIPTION

Figure 1:
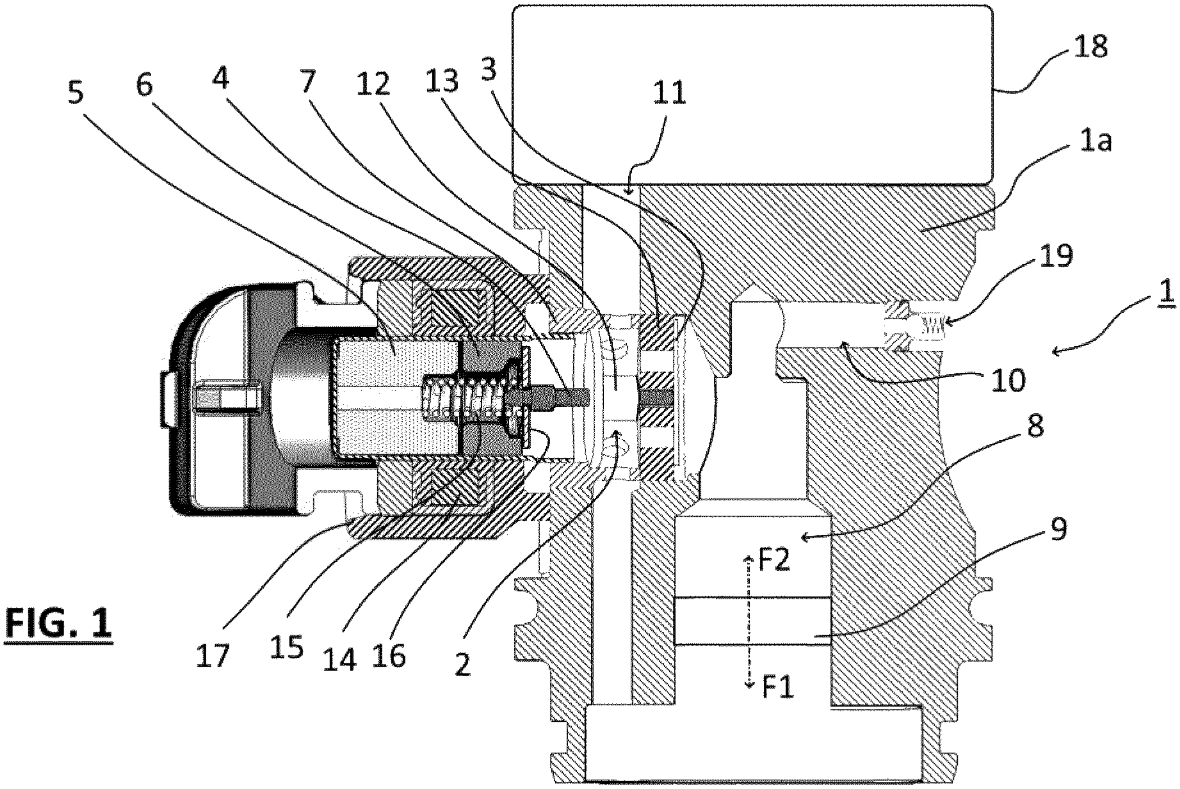
FIG. 1 is a side cut view of a pump.

In FIG. 1 a pump 1 is provided to suck liquid fluid such as gasoline from an inlet damper 18 through an inlet conduit 11 in order to supply a common rail injection system circuitry not shown through an outlet pipe 10.

The disclosure mainly concerns a pump for pressurizing a common rail system of a gasoline engine, but the invention may apply to liquid fluids other than gasoline such as diesel fuel, LPG or even liquid hydrogen.

Between the inlet conduit and the outlet pipe, the pump comprises an inlet chamber 2 and a compression chamber 8 which are separated by a valve 3. The valve is located between the inlet chamber and the compression chamber, at a first end of the inlet chamber and is actuated by a pushing rod 4 attached to a moving plate 16 actuated by an electromagnetic actuator at a second end of the inlet chamber. The electromagnetic actuator comprises a solenoid 14, a first magnetic body 5, a second magnetic body 6, a spring 15 and the moving plate. The electromagnetic actuator is received in a housing 17 attached to the pump body 1*a*. The moving plate is attracted by the second magnetic body when the solenoid is powered and pushed away from the second magnetic body by the spring when the solenoid is not powered.

The compression chamber is above a cylinder where a piston 9 reciprocates. The piston when travelling in direction F1 to its BDC (Bottom dead center) sucking gasoline from the inlet chamber and when travelling in direction F2 in direction of its TDC (Top Dead Center) either pushing gasoline in the outlet pipe 10 in communication with the common rail circuitry through a non-return outlet valve 19 or pushing gasoline back in the inlet chamber depending on the valve status.

Figure 3:
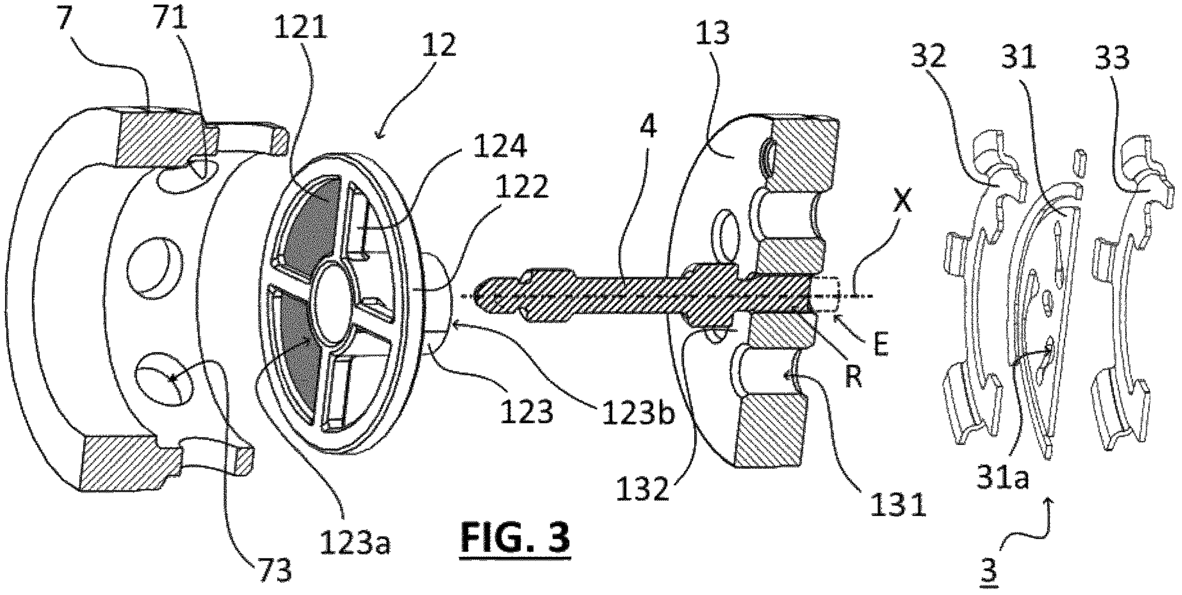
FIG. 3 is an exploded cut view of a valve and filter.

The valve 3 which is better seen in the partially cut exploded view of FIG. 3 comprises a resilient cup 31 having open gasoline passageways 31*a*. The resilient cup is retained against a valve armature 13 with rings 32, 33. The armature comprises gasoline passage holes 131 which are closed by the resilient cup when said cup is forced against the armature by pressure in the compression chamber and when the pushing rod is in a retracted position R.

Figure 4A:
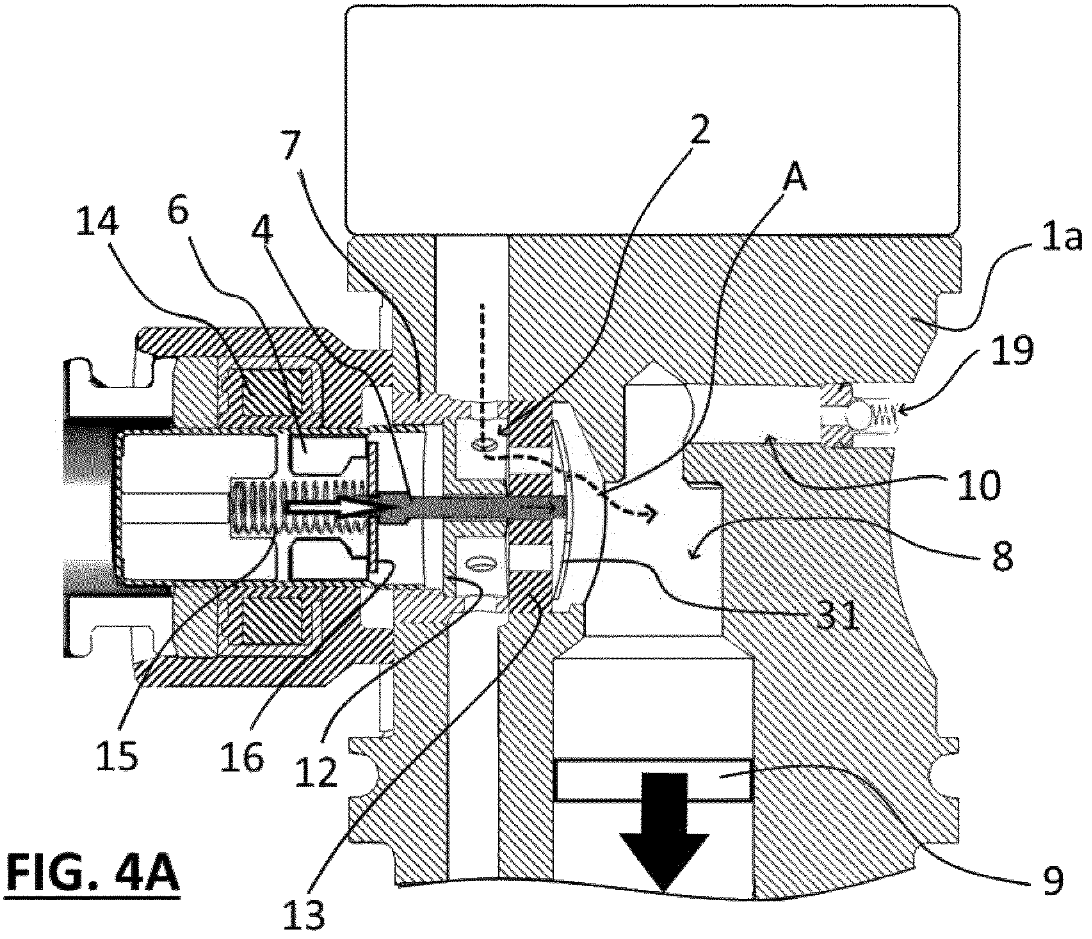
FIGS. 4A, 4B, 4C show different working positions of the valve system of FIG. 3.
Figure 4B:
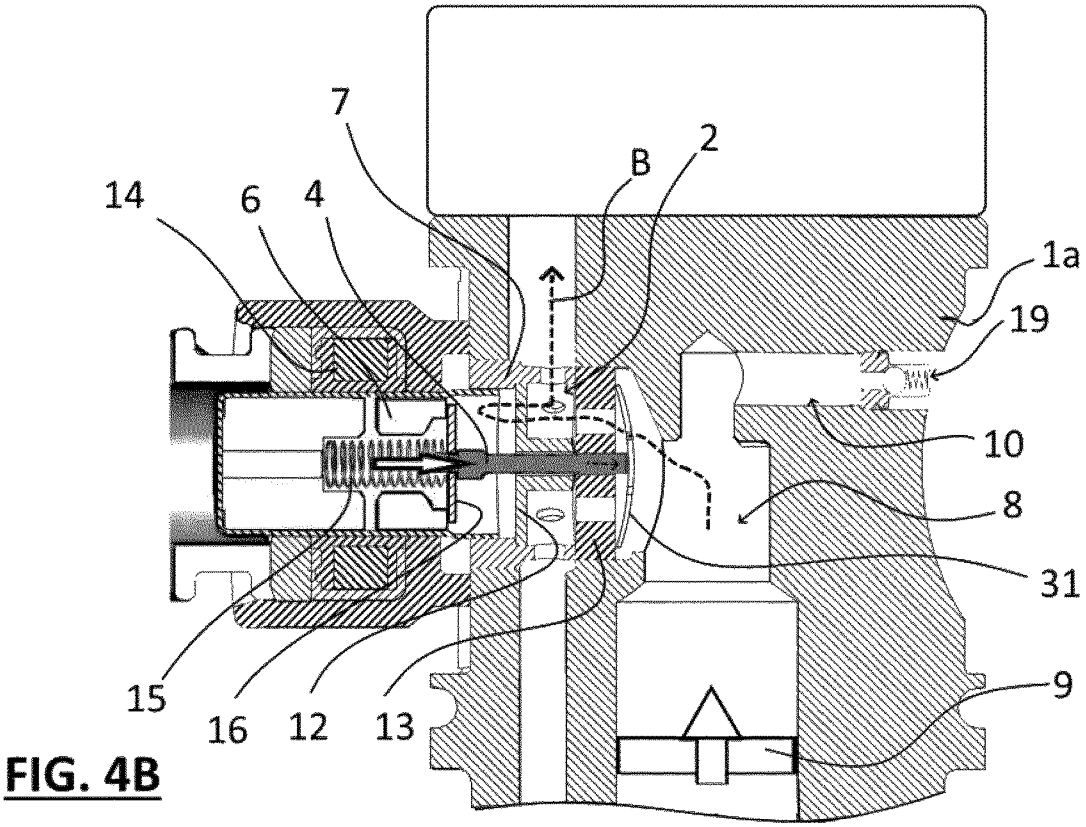
Figure 4C:
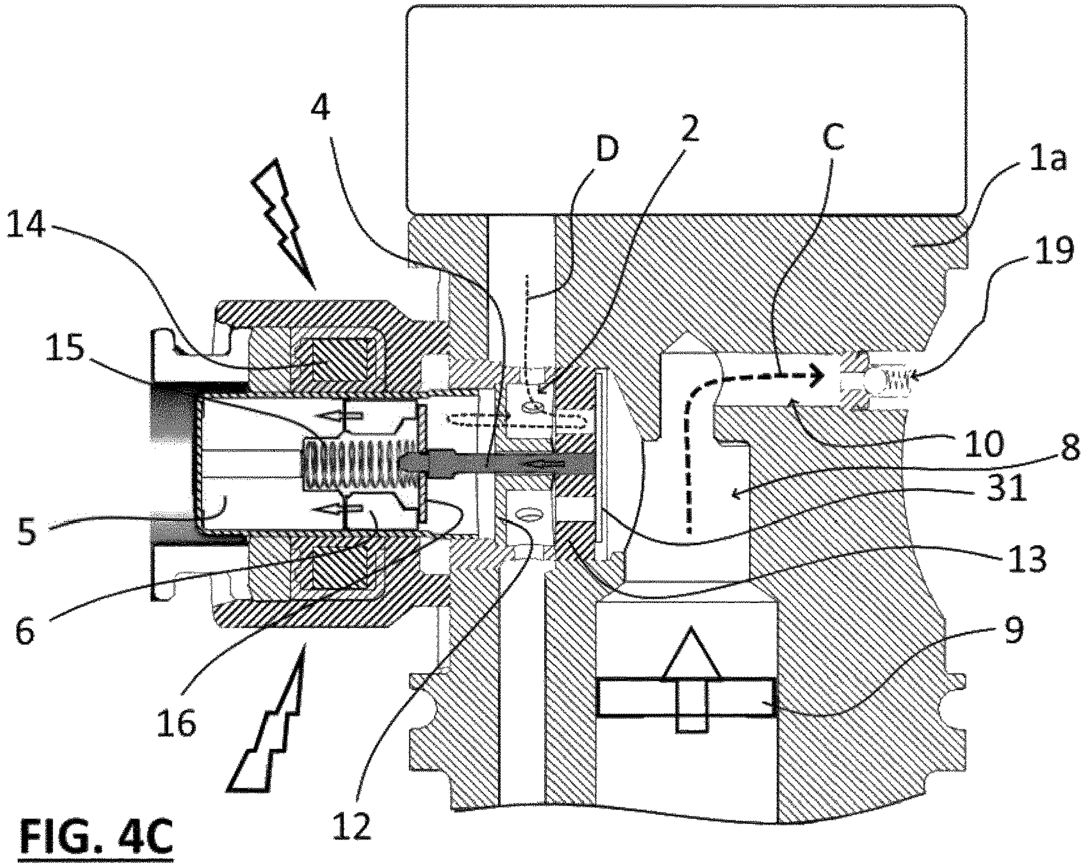

Working of the valve system is shown in FIGS. 4A to 4C, In FIG. 4A, the solenoid 14 is not powered and the spring 15 pushes the assembly comprising the second magnetic body 6, the moving plate 16 and the pushing rod 4 which are attached together. In this position the pushing rod pushes the resilient cup 31 thus opening the passages between the inlet chamber 2 and the compression chamber 8. Such liquid fluid passage holes are open when the resilient cup is pushed away from the armature by the pushing rod in the extended position E under the action of the spring 15. More precisely, when the pushing rod 4 is in the extended position E, the resilient cup is not anymore in contact with the armature 13 so that the gasoline passage holes 131 of FIG. 3 are open and gasoline may enter or leave said compression chamber through the open liquid fluid passageways 31*a* of the resilient cup and the liquid fluid passage holes of the armature as shown with arrow A. This position coincides with the piston going in the direction of its BDC and sucking gasoline from the inlet chamber into the compression chamber. In FIG. 4B, the piston has reached the BDC and is starting its travel towards the TDC. In order to control the quantity of fluid in the compression chamber, the solenoid remains unpowered to keep the pushing rod extended for a duration allowing some fluid in the compression chamber to go back in the inlet chamber as shown with arrow B. As can be seen, some liquid fluid may go through the fixed seal 12 into the volume containing the spring 15, moving plate 16 and second magnetic body to lubricate such parts during the fluid travel within the inlet chamber. In FIG. 4C, the pushing rod is retracted in position R through the action of the energized solenoid of the electromagnetic actuator 14 in which the first magnetic body 5 attracts the second magnetic body 6 and moving plate 16 which compresses the spring 15. In such position, the passages between the inlet chamber 2 and compression chamber 8 are closed and liquid fluid in the compression chamber may not return from said compression chamber to said inlet chamber which permits the ascending piston to force gasoline in the common rail injection through the outlet pipe 10 having a non-return outlet valve 19 in order to build pressure in the common rail circuitry according to arrow C while gasoline in the inlet chamber travels in such chamber under action of the moving second magnetic body 6 as shown with arrow D.

The piston of the pump is actuated through a cam system of the engine and its frequency of movements depends on the engine revolution speed. The solenoid is controlled at the same frequency than the piston but its duty cycle is adapted to control the pushing rod and valve in accordance with the need of feeding more fluid in the common rail circuit when the engine is loaded through preventing fluid return from the compression chamber to the inlet chamber and feeding less fluid in the circuit when the engine is at idle or in deceleration phases through allowing fluid in the compression chamber to return in the inlet chamber instead of being fed in the common rail circuit.

Figure 2:
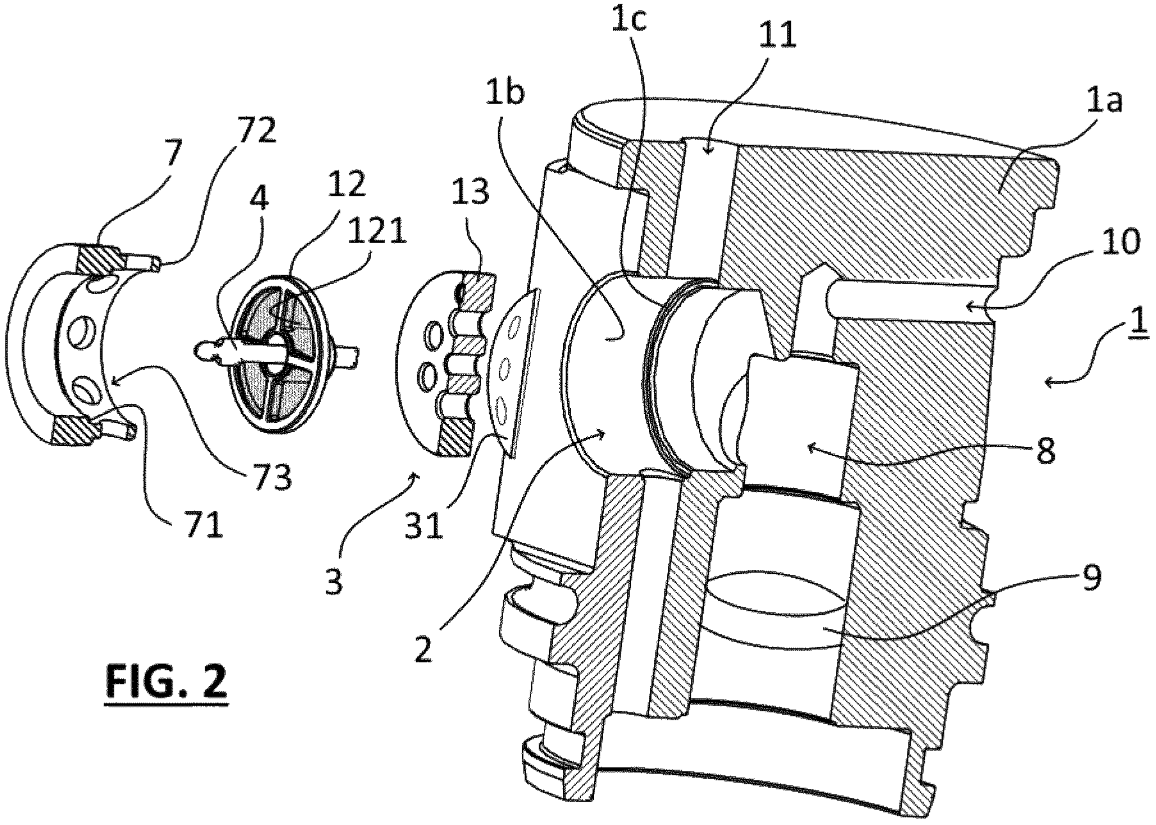
FIG. 2 is an exploded cut view of a part of a pump.

The filter 12 and its positioning is shown in the cut exploded views of FIG. 2 and FIG. 3. The filter comprises a mesh disk or mesh disk elements 121 located between a rim 122 and a tubular sheath 123. In FIG. 2 the complete mesh disk is shown while in FIG. 3 only two sectors are shown to allow seeing radial rods 124, provided between the rim and the tubular sheath, and its attachment to the sheath. The rim, mesh disk element and tubular sheath have a common axis with the pushing rod that passes through the tubular sheath with a play defined to prevent debris of a size greater than the mesh openings. A proximal end 123*a* of the tubular sheath is located in a common plane with the rim and mesh disk, or mesh disk elements, and a distal end 123*b* of the tubular sheath projects away from such plane.

The tubular sheath forms a hub and the mesh disk or mesh disk elements extend radially from said hub at the proximal end of said hub.

Still in FIGS. 2 and 3, the inlet chamber is made inside a tubular sleeve 7 received in a tubular housing 1*b* provided in the pump body and in which the inlet conduit 11 exits. The tubular sleeve comprises intake holes 73 in communication with the inlet conduit to allow gasoline to enter the inlet chamber or exit the inlet chamber.

As better depicted in FIG. 3 the fixed filter is located and trapped between an annular central region 132 of the valve armature 13, located around a hole in which passes the pushing rod 4, and a shoulder 71 of the tubular sleeve 7 located in the tubular housing 1*b* and providing the inlet chamber. In this configuration, the distal end of the tubular sheath 123 is pressed against the annular central region 132 of the armature around the passage for the pushing rod while an edge of the rim opposed to such distal end rests against the shoulder of the tubular sleeve. In this configuration, the filter is firmly held in position between the shoulder of the tubular sleeve and the armature providing a watertight fit so that no gasoline nor particles may pass through these locations.

In the assembly of the parts providing the inlet chamber, the valve 3 rests against a flange 1*c* of the pump housing and the armature 13 is trapped between the valve periphery and a distal end 72 of the tubular sleeve 7 inserted in the tubular housing.

As the filter is trapped between the sleeve and the armature, axial load on the sealing surfaces which are the shoulder 71 and the center 132 of the armature is provided to provide the watertight fit. The filter mesh disk elements 121 provide filtering between the inlet chamber part having the holes 73 in communication with the inlet conduit 11 and a second part of the inlet chamber in communication with the electromagnetic actuator elements in order to lubricate such elements.

The filter may possibly be added to a refurbished pump with only a modification of the tubular sleeve in order to add the shoulder 71 through machining of the inner surface of the tubular sleeve with a lathe or a change of the tubular sleeve if such is not already provided with the shoulder.

As seen in FIG. 3, the filter 12 does not disturb working of the pushing rod 4 which reciprocates in the tubular sheath

123 of the filter as sufficient play between the inner tubular hole of the sheath and the outer diameter of the pushing rod is provided.

the filter design provides a sealing located between static surfaces to avoid functionality impacts and which has no contact with the moving pushing rod.

The filter may be designed using a plastic overmoulding of the rim, tubular sheath and radial rods on a disk mesh with a central hole and the disk mesh may be a stainless steel or a Nylon Mesh having 25 to 35 micrometer mesh openings. Other materials or technologies adapted to resist the pump working temperature range and gasoline or other liquid combustible may be used to manufacture the filter. The invention is not limited to the description hereabove and in particular other attachment means than radial rods may be used between the rim and the tubular sheath.

NOMENCLATURE

1—pump
1*a*—pump body
1*b*—tubular housing
1*c*—flange
2—inlet chamber
3—valve
4—pushing rod
5—first magnetic body
6—second magnetic body
7—tubular sleeve
8—compression chamber
9—piston
10—outlet pipe
11—inlet conduit
12—filter
13—valve armature
14—solenoid
15—spring
16—moving plate
17—housing
18—inlet damper
19—non-return outlet valve
31—resilient cup
31*a*—open liquid fluid passageways
32, 33—rings
71—shoulder of the tubular sleeve 7
72—distal end of the tubular sleeve 7
73—intake holes of the tubular sleeve 7
121—mesh disk elements of the filter 12
122—rim of the filter 12
123—tubular sheath of the filter 12
123*a*—proximal end of the tubular sheath
123*b*—distal end of the tubular sheath
124—radial rods of the filter 12
131—liquid fluid passage holes of the valve armature 13
132—annular central region of the valve armature 13

The invention claimed is:

1. An injection pump having a pump body provided with an inlet conduit supplying an inlet chamber, a compression chamber downstream from the inlet chamber under which a piston reciprocates to distribute liquid fluid from the compression chamber to an outlet pipe in communication with a common rail circuitry, said injection pump having a valve provided with a resilient cup, located between the inlet chamber and the compression chamber and actuated by an electromagnetic actuator through a pushing rod wherein operation of the valve by the electromagnetic actuator allows the piston to suck liquid fluid from the inlet chamber into the compression chamber and feed the common rail circuitry or to push back liquid fluid in said inlet chamber and said inlet conduit, characterized in that the pump comprises a fixed filter provided around the pushing rod and located between the valve and the electromagnetic actuator in the inlet chamber, said filter being configured to prevent particles travelling in the inlet chamber to reach the electromagnetic actuator, wherein the filter comprises a mesh disk, or mesh disk elements, located between a rim and a tubular sheath in which the pushing rod is received, said tubular sheath having a proximal end receiving said mesh disk or mesh disk elements and having a distal end away from said mesh disk or mesh disk elements.

2. The injection pump according to claim 1, wherein said filter comprises radial rods between the rim and the tubular sheath.

3. The injection pump according to claim 1, wherein said filter is trapped between an annular shoulder of a tubular sleeve of the inlet chamber and a fixed valve armature in the inlet chamber.

4. The injection pump according to claim 1, wherein the inlet chamber is tubular and has a common axis with an axis of the pushing rod.

5. The injection pump according to claim 3, wherein an edge of said rim sits against said annular shoulder while the distal end of said tubular sheath rests against an annular central region of said armature.

6. The injection pump according to claim 1, wherein the valve comprises a resilient cup having open liquid fluid passageways and retained against said valve armature with rings and wherein, when the pushing rod is extended, said resilient cup opens holes in said valve armature to let liquid fluid enter said compression chamber from said compression chamber through said passageways while, when said pushing rod is retracted through the action of said actuator, liquid fluid may not return from said compression chamber to said inlet chamber.

7. The injection pump according to claim 1, wherein said inlet conduit is in communication with an inlet damper.

* * * * *